United States Patent
Lahr

(10) Patent No.: US 6,826,839 B2
(45) Date of Patent: Dec. 7, 2004

(54) ANGLE MEASURING SYSTEM

(75) Inventor: Johann Lahr, Traunwalchen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/051,380

(22) Filed: Jan. 18, 2002

(65) Prior Publication Data

US 2002/0112357 A1 Aug. 22, 2002

(30) Foreign Application Priority Data

Jan. 23, 2001 (DE) .......................................... 101 02 957

(51) Int. Cl.⁷ ................................................ G01B 7/30
(52) U.S. Cl. .......................... 33/1 PT; 33/1 M; 33/573
(58) Field of Search ................................ 33/1 PT, 412, 33/529, 533, 613, 645, 549–550, 1 M, 568, 573; 403/1, 388

(56) References Cited

U.S. PATENT DOCUMENTS

| 4,660,288 A | * | 4/1987 | Dangschat | 33/1 PT |
| 4,989,329 A | * | 2/1991 | Pullen | 33/1 PT |
| 5,758,427 A | * | 6/1998 | Feichtinger et al. | 33/1 PT |
| 5,771,594 A | | 6/1998 | Feichtinger | |
| 6,170,162 B1 | * | 1/2001 | Jacobsen et al. | 33/1 PT |
| 6,311,402 B1 | * | 11/2001 | Brandl et al. | 33/1 PT |
| 6,470,577 B1 | * | 10/2002 | Tondorf et al. | 33/1 PT |
| 6,601,307 B2 | * | 8/2003 | Meyer | 33/1 PT |
| 6,735,877 B2 | * | 5/2004 | Torr | 33/1 PT |
| 2002/0002777 A1 | * | 1/2002 | Torr | 33/1 PT |
| 2002/0078761 A1 | * | 6/2002 | Meyer | 73/862.08 |

FOREIGN PATENT DOCUMENTS

| DE | 88 12 317.0 U1 | 11/1988 |
| DE | 89 15 109.7 U1 | 2/1990 |
| DE | 299 11 508 | 1/2001 |
| EP | 0 762 081 A1 | 3/1997 |
| JP | 62-156822 | 10/1987 |

OTHER PUBLICATIONS

Patent Abstracts of Japan regarding Japanese Patent Publication 08284971, published by Japanese Patent Office, vol. 1997, No. 3, Mar. 31, 1997, one page.

* cited by examiner

Primary Examiner—Diego Gutierrez
Assistant Examiner—Yaritza Guadalupe
(74) Attorney, Agent, or Firm—Brinks Hofer Gilson & Lione

(57) ABSTRACT

An angle measuring system that includes a rotor that rotates about an axis of rotation. A scanning unit is spaced from the rotor and the scanning unit is attached to a stator. The angle measuring system further includes a base and a coupling connected to the base and the stator so that a torsion-proof connection between the base and the stator results, wherein the coupling permits radial and axial compensating movements of the stator with respect to the base and the axis of rotation, wherein a first stop at the base and a second stop at the stator limit the radial and axial compensating movements.

18 Claims, 2 Drawing Sheets

ANGLE MEASURING SYSTEM

Applicant claims, under 35 U.S.C. §119, the benefit of priority of the filing date of Jan. 23, 2001 of a German patent application, copy attached, Serial Number 101 02 957.8, filed on the aforementioned date, the entire contents of which is incorporated herein by reference.

BACKGROUND OF THE INVENTION

1. Field of the Invention

The present invention relates to an angle measuring system having a coupling for the torsion-proof connection of a base with a stator, wherein the coupling permits radial and axial compensating movements of the stator with respect to the base.

2. Discussion of Related Art

Angle measuring systems are employed, for example, for measuring the angular position of an engine shaft. For this purpose, the angle measuring system has a rotating element (rotor) and a static element (stator) in its housing. The rotor is fastened on the engine shaft, so that it follows all movements of the shaft and rotates along with the shaft in relation to the stator. The rotor has a graduation, which is scanned by a scanning unit of the angle measuring system fastened to the stator, and whose signals are employed for calculating the angle position of the shaft.

In this case the scanning unit, and therefore the stator, must be seated in such a way that they are connected with the motor housing in a torsion-proof manner with respect to the rotor. Each rotating movement of the stator would lead to an error in the measurement of the angular position. But the stator should be able to follow axial and radial movements of the shaft. In this way it is assured that the distance between the rotating graduation and the scanning unit does not change and a constant signal quality is obtained. This is achieved in that an appropriate coupling is provided between the stator and the base of the angle measuring system, which is fixedly connected with the motor housing. The base can be a portion of the housing of the angle measuring system here.

An angle measuring system with such a coupling is described in DE 299 11 508 U1, for example. In the course of the use of such angle measuring systems, tolerances are predetermined for the maximum deflection of the motor shaft in the radial and axial direction. If these are exceeded, there is the danger of the destruction of the coupling, since it is made of a flexible, shaped sheet metal element.

An angle measuring system with a coupling of flexible sheet metal elements is also described in Japanese Laid-Open Utility Model 62-156822. There it is provided to limit the axial movements permitted by the coupling by means of a stop. However, the coupling used only permits axial movements, which are limited by the stop, which is constructed from additional components and is therefore expensive.

OBJECTS AND SUMMARY OF THE INVENTION

It is therefore an object of the present invention to recite an angle measuring system, which limits the radial and axial movements of the stator by simply constructed stops and in this way prevents damage to the coupling between the stator and the base.

This object is attained by an angle measuring system that includes a rotor that rotates about an axis of rotation. A scanning unit is spaced from the rotor and the scanning unit is attached to a stator. The angle measuring system further includes a base and a coupling connected to the base and the stator so that a torsion-proof connection between the base and the stator results, wherein the coupling permits radial and axial compensating movements of the stator with respect to the base and the axis of rotation, wherein a first stop at the base and a second stop at the stator limit the radial and axial compensating movements.

The present invention resides in that the stops at the base and at the stator of the angle measuring system limit the radial and axial movements of the stator in such a way that the coupling between the stator and the base cannot be damaged. Here, the stops in the axial and radial directions are constituted by screws, by which the coupling is fastened on the one end on protruding strips of the base, and which, at the other end, project into bores of a matching size in the stator. The stops in a further radial direction are constituted by the protruding strips of the base itself. In this way stops are obtained for the radial and axial movements of the stator with respect to the base without using additional components.

Further advantages, as well as details, of the present invention ensue from the following description of a preferred embodiment, making reference to the drawings.

DETAILED DESCRIPTION OF THE PREFERRED EMBODIMENTS

Figure 1:
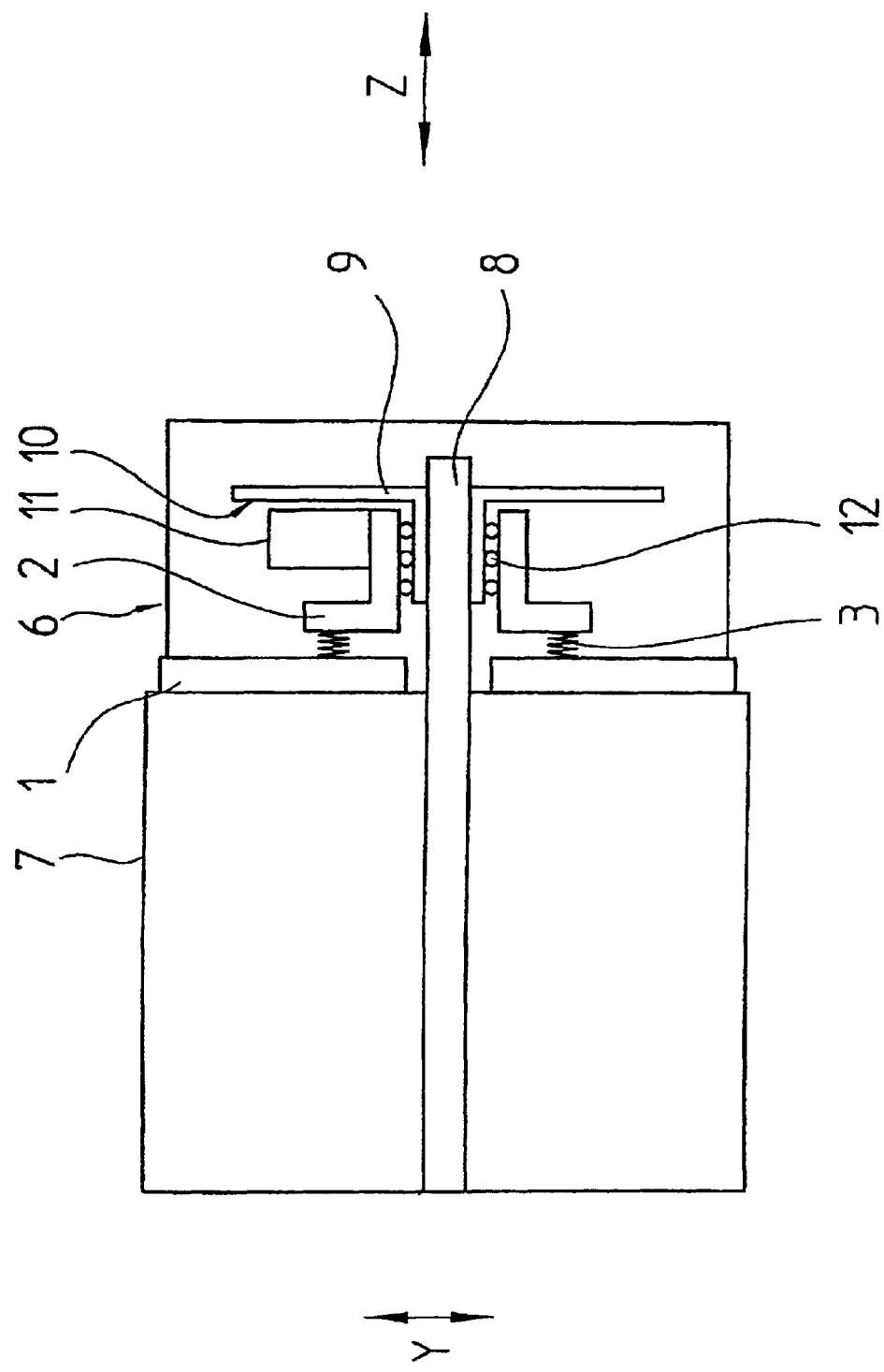
FIG. 1 shows an embodiment of an angle measuring system on a motor in accordance with the present invention.

In FIG. 1 the base 1 of the angle measuring system 6 is connected with the housing of a motor 7, whose shaft 8 projects into the angle measuring system 6. The rotor 9 of the angle measuring system 6 has been pushed onto the shaft 8 and fastened in a torsion-proof manner so that the shaft 8 and rotor 9 rotated about an axis of rotation. A graduation 10 is located on the rotor 9 and is scanned by a scanning unit 11 that is spaced from the rotor 9. The scanning unit 11 is furthermore fastened on a stator 2 and provides the information regarding the angular position of the shaft 8. In order to keep the scanning distance between the scanning unit 11 and the graduation 10 on the rotor 9 constant, the stator 2 must be able to follow axial and radial movements of the shaft 8, which are transmitted via a bearing 12 to the stator 2. But the stator 2 must not follow rotating movements of the shaft 8 with respect to the base 1, since in that case the measurement of the angular position would be distorted. For this reason, the stator 2 is fastened to the base by a coupling 3, only schematically represented, which does allow radial and axial movements of the stator, but otherwise constitutes a torsion-proof connection between the base 1 and the stator 2. Such a coupling 3 is described in DE 299 11 508 U1 mentioned at the outset, particular reference is made to FIG. 3 there.

Maximum values for radial and axial movements of the shaft 8 are provided to the user of the angle measuring system 6. If these should be exceeded for any reasons at all, it is advantageous to limit the mobility of the stator 2 by stops in order to prevent damage to the coupling 3.

Figure 2:
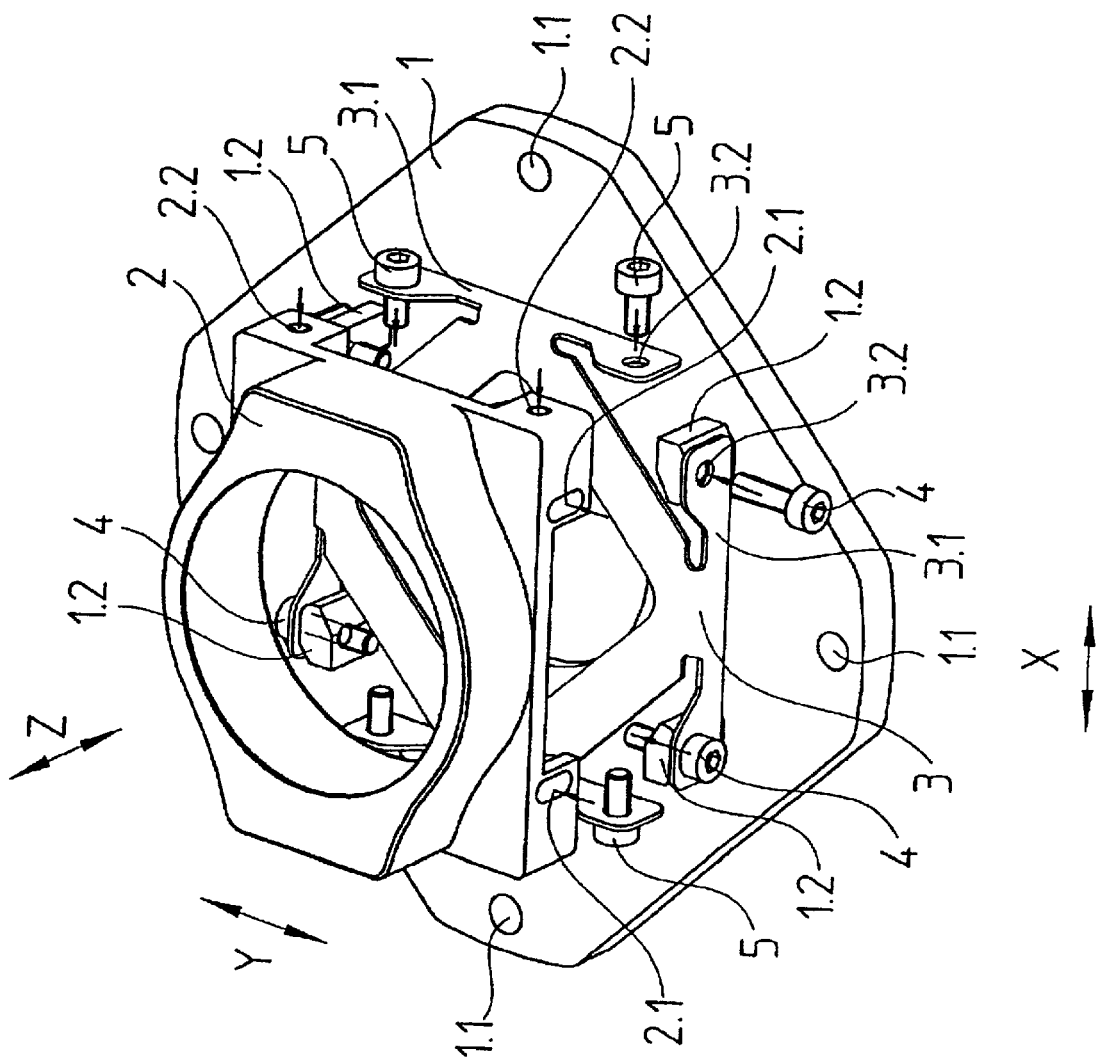
FIG. 2 shows an embodiment of a base, stator and coupling to be used with the angle measuring system of FIG. 1 in accordance with the present invention.

Therefore, FIG. 2 shows the fastening in accordance with the present invention of the coupling 3 on the base 1, by which such stops result without additional components. The coupling 3 includes a punched and bent sheet metal element, from which brackets 3.1 have been bent off and provided with bores 3.2. The coupling 3 is screwed together through these bores 3.2 by first screws 4 with four protruding strips 1.2 of the base 1, and by second screws 5 with four bores 2.2 at the stator 2. The first screws 4 project past the strips 1.2 into openings 2.1 in the stator 2. The openings 2.1 are of such a size that they permit a displacement of the stator 2 with respect to the base 1 in the X and Z directions, until the edge of an opening comes into contact with a first screw 4. The openings 2.1 can have the approximate shape of elongated holes. Thus, the mobility of the stator 2 with respect to the base 1 is limited by stops in the axial direction Z and a radial direction X.

A further limitation of the movement of the stator 2 in a second radial direction Y is obtained in that the distance of the protruding strips 1.2 of the base 1 to the stator 2 is selected to be such that the stator 2 comes into contact with the strips 1.2 when it has achieved its maximally permitted deflection in the direction Y. Thus, the first screws 4 must be of sufficient length for bridging this distance between the strips 1.2 and the stator 2 and to project into the openings 2.1 of the stator 2.

By the described fastening of the coupling 3 on the base 1, stops are obtained for deflections of the stator 2 in the axial and radial directions without requiring additional components. Thus, the stator 2 and the coupling 3 can be very easily mounted.

In a variation of the present invention, not shown, it is of course also possible to form stops in that the second screws 5 project into openings, also not shown, of the base 1.

In an advantageous manner, the freedom of movement of the stator 2 with respect to the base 1 provided by the stops will be selected to be greater than the tolerances for the radial and axial shaft movement specified to a customer, since in case of contact it will be necessary to absorb forces, for example by the bearing 12 of the shaft 8, something which should not occur during normal operations.

The foregoing description is provided to illustrate the invention, and is not to be construed as a limitation. Numerous additions, substitutions and other changes can be made to the invention without departing from its scope as set forth in the appended claims.

I claim:

1. An angle measuring system comprising:
   a rotor that rotates about an axis of rotation;
   a scanning unit spaced from said rotor, said scanning unit attached to a stator;
   a base;
   a coupling connected to said base and said stator so that a torsion-proof connection between said base and said stator results, wherein said coupling permits radial and axial compensating movements of said stator with respect to said base and said axis of rotation, wherein a first stop at said base and a second stop at said stator limit said radial and axial compensating movements.

2. The angle measuring system of claim 1, wherein said coupling is produced in one piece as a punched and bent element.

3. The angle measuring system of claim 2, wherein said coupling is fastened on said base by a first screw, and said coupling is fastened on said stator by a second screw.

4. The angle measuring system of claim 1, wherein said coupling is fastened on said base by a first screw, and said coupling is fastened on said stator by a second screw.

5. The angle measuring system of claim 4, wherein said second stop at said stator is defined, at least in part, by said first screw projecting into an opening of said stator.

6. The angle measuring system of claim 5, wherein said first stop at said base is defined, at least in part, by said second screw projecting into an opening of said base.

7. The angle measuring system of claim 6, wherein said opening of said stator is embodied as a first elongated hole and said opening of said base is embodied as a second elongated hole.

8. The angle measuring system of claim 7, wherein said axial compensating movement is performed in a direction parallel to said axis of rotation.

9. The angle measuring system of claim 8, wherein said radial compensating movement is performed in two radial directions that are perpendicular to one another and perpendicular to said axis of rotation.

10. The angle measuring system of claim 7, wherein said radial compensating movement is performed in two radial directions that are perpendicular to one another.

11. The angle measuring system of claim 5, wherein said opening of said stator is embodied as an elongated hole.

12. The angle measuring system of claim 4, wherein said first stop at said base is defined, at least in part, by said second screw projecting into an opening of said base.

13. The angle measuring system of claim 12, wherein said opening of said base is embodied as an elongated hole.

14. The angle measuring system of claim 1, wherein said first stop at said base comprises a projecting strip on said base.

15. The angle measuring system of claim 14, wherein said coupling is screwed to said projecting strip by said first screw.

16. The angle measuring system of claim 1, wherein said axial compensating movement is performed in a direction parallel to said axis of rotation.

17. The angle measuring system of claim 16, wherein said radial compensating movement is performed in two radial directions that are perpendicular to one another and perpendicular to said axis of rotation.

18. The angle measuring system of claim 1, wherein said radial compensating movement is performed in two radial directions that are perpendicular to one another.

* * * * *